US008787380B2

(12) United States Patent
Taleb et al.

(10) Patent No.: US 8,787,380 B2
(45) Date of Patent: Jul. 22, 2014

(54) METHOD FOR CONTROLLING THE TRAFFIC WITHIN A NETWORK STRUCTURE AND A NETWORK STRUCTURE

(75) Inventors: Tarik Taleb, Heidelberg (DE); Stefan Schmid, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 184 days.

(21) Appl. No.: 13/391,016

(22) PCT Filed: Aug. 20, 2010

(86) PCT No.: PCT/EP2010/005123
§ 371 (c)(1),
(2), (4) Date: Apr. 3, 2012

(87) PCT Pub. No.: WO2011/020624
PCT Pub. Date: Feb. 24, 2011

(65) Prior Publication Data
US 2012/0182940 A1    Jul. 19, 2012

(30) Foreign Application Priority Data

Aug. 20, 2009  (EP) ..................... 09010725

(51) Int. Cl.
*H04L 12/28*  (2006.01)
(52) U.S. Cl.
USPC ......................................... 370/392
(58) Field of Classification Search
USPC ........................... 370/230, 328, 338, 389, 392
See application file for complete search history.

(56) References Cited

U.S. PATENT DOCUMENTS

| 2002/0181500 | A1* | 12/2002 | Higuchi et al. | 370/466 |
| 2003/0048804 | A1* | 3/2003 | Inouchi et al. | 370/466 |
| 2004/0017796 | A1* | 1/2004 | Lemieux et al. | 370/349 |
| 2005/0177722 | A1* | 8/2005 | Vaarala et al. | 713/168 |
| 2006/0294363 | A1* | 12/2006 | Bae et al. | 713/153 |
| 2008/0244744 | A1* | 10/2008 | Thomas et al. | 726/23 |

(Continued)

FOREIGN PATENT DOCUMENTS

| WO | 2008/060208 | 5/2008 |
| WO | 2009075033 A1 | 6/2009 |

OTHER PUBLICATIONS

NEC. "Architecture alternative for Local IP Access." 3GPP TSG SA WG2 Meeting #72. TD S2-091989. Mar. 30-Apr. 3, 2009. pp. 1-5.*

(Continued)

*Primary Examiner* — Hassan Kizou
*Assistant Examiner* — Ashil Farahmand
(74) *Attorney, Agent, or Firm* — Young & Thompson

(57) ABSTRACT

A reliable and flexible method for controlling traffic within a network structure without the addition of remarkable complexity to the core network is provided, the structure including a PDN (Packet Data Network), an operator core network with a DNS (Domain Name System) server, a HeNB (Home evolved Node B) or HNB (Home Node B) and/or eNB (Evolved Node B) or NB (Node B) and a UE (User Equipment) that is associated with the HeNB or HNB and/or eNB or NB. On the basis of a predefinable routing policy the DNS server is controlling whether a traffic from a UE to a destination address within a local network associated to the HeNB or HNB or eNB or NB or within a PDN and/or vice versa will be routed via the core network or directly via the local network in support of local network protocol access or selected network protocol traffic offload.

22 Claims, 5 Drawing Sheets

(56) References Cited

U.S. PATENT DOCUMENTS

Figure 1:
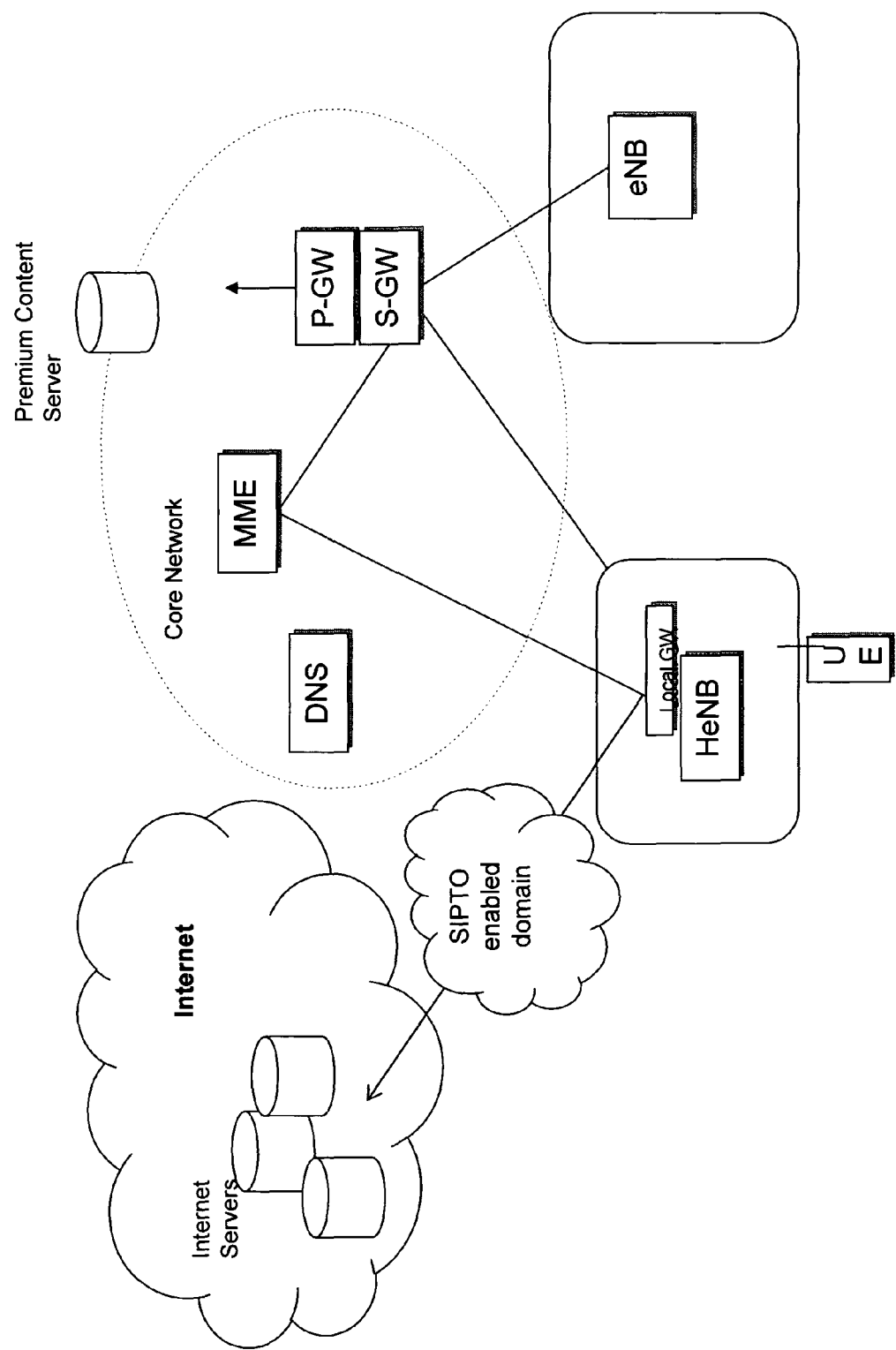

2009/0234956 A1* 9/2009 Wang et al. .................... 709/228
2010/0054222 A1* 3/2010 Rune ............................. 370/338
2010/0226372 A1 9/2010 Watanabe

OTHER PUBLICATIONS

3GPP TS 22.220, V9.1.1, pp. 12-13, Jun. 2009, 3rd Generation Partnership Project; Technical Specification Group Services and System Aspects; Service requirements for Home NodeBs and Home eNodeBs (Release9), <URL:http://www.3gpp.org/ftp/Specs/archive/22_series/22.220/22220-911.zip>.

Japanese Office Action, from corresponding JP application.

International Search Report dated Mar. 31, 2011, corresponding to PCT/EP2010/005123.

Huawei; "Lifting content from TR 23.830 to Local IP Access and Internet Offload TR"; Mobile Competence Centre; Jul. 20, 2009.

Srisuresh Lucent Technologies Matt Holdrege Ascend Communications; "IP Network Address Translator (NAT) Terminology and Considerations"; Internet Engineering Task Force; Jun. 1, 1999.

Vodafone et al., "Selected IP Traffic Offload", 3GPP TSG-SA WG1 Meeting #47, S1-093341, Aug. 7, 2009, 3rd Generation Partnership Project.

Vodafone, "Definition for Local IP Access and Selected IP Traffic Offload", 3GPP TSG-SA WG1 Meeting #47, S1-093342, Aug. 7, 2009, 3rd Generation Partnership Project.

NEC, "Support of operator control for SIPTO/LIPA traffic", 3GPP TSG-SA WG2 # 75, S2-095291, 2009, pp. 1-7, Sep. 2009.

* cited by examiner

METHOD FOR CONTROLLING THE TRAFFIC WITHIN A NETWORK STRUCTURE AND A NETWORK STRUCTURE

BACKGROUND OF THE INVENTION

The present invention relates to a method for controlling the traffic within a network structure, said structure comprising a PDN (Packet Data Network), an operator core network with a DNS (Domain Name System) server, a HeNB (Home evolved NodeB) or HNB (Home NodeB) and/or eNB (Evolved Node B) or NB (Node B), and a UE (User Equipment) that is associated with said H(e)NB and/or (e)NB.

Further, the present invention relates to a network structure, preferably for carrying out the above method, said structure comprising a PDN (Packet Data Network), an operator core network with a DNS (Domain Name System) server, a HeNB (Home evolved Node B) or HNB (Home NodeB) and/or eNB (Evolved Node B) or NB (Node B), and a UE (User Equipment) that is associated with said H(e)NB and/or (e)NB.

DESCRIPTION OF THE RELATED ART

In 3GPP there is ongoing, intensive search for architectural enhancements to efficiently support local IP connectivity. Currently such local IP connectivity is briefly denoted as LIPA (Local IP Access), in case the traffic is directed to a local network (e.g. a home network or an enterprise network) or as SIPTO (Selected IP Traffic Offload), in case the traffic is directed towards the Internet. The 3GPP efforts are directed both to home cell (i.e. H(e)NB) and the macro cell (i.e. (e)NB) scenarios, and for EPS (see for reference 3GPP TS 23.401 V8.6.0 (2009-06), "General Packet Radio Service (GPRS) enhancements for Evolved Universal Terrestrial Radio Access Network (E-UTRAN) access") and GPRS (see for reference 3GPP TS 23.060 V8.5.1 (2009-06), "General Packet Radio Service (GPRS); Service description"). 3GPP SA2 has started normative work already according to S2-094867, "New WID for Local IP Access & Internet Offload". The present invention builds on assumptions and principles defined in these specifications and documents and related specifications, as will be explained in more detail below.

IP connectivity for a UE towards an external (target) PDN (Packet Data Network) in the current state of the art of mobile network technology is provided by the PDN Gateway (P-GW) in the mobile network operator's core network. Mobility tunnels carry the traffic via the (e)NodeB and Serving-Gateway. Similarly, in GPRS scenarios IP connectivity is provided by the GGSN (Gateway GPRS Support Node) that corresponds to the PDN gateway in EPS scenarios. Further, in UTRAN radio access (3G) mobility tunnels carry the traffic via the NodeB, the RNC (Radio Network Controller) and the SGSN (Serving GPRS Support Node).

The general problem is that the amount of plain ("dumb") Internet traffic or traffic to local servers (e.g. in the home or enterprise network) is expected to grow considerably in the future. This type of traffic should not consume expensive resources in the mobile operator network, and consequently should be offloaded from his network as soon as possible. One possible location for IP traffic breakout is at the H(e)NB or (e)NB.

Current state of the art has the concept of APN (Access Point Name), which allows separating traffic. The APN takes the form of a FQDN (Fully Qualified Domain Name) and is resolved ultimately to an IP address of the P-GW or GGSN that provides access to the respective PDN. In current discussions in standardization it is mostly assumed that for LIPA/SIPTO traffic a separate APN is used; requirements have also been stated that one common APN may be used for LIPA/SIPTO and non-LIPA/SIPTO type of traffic. No solution to achieve service continuity upon a handover of a UE to different H(e)NBs or (e)NBs has been given.

Further, from TS Group Services and System Aspects; Local IP Access and Selected IP Traffic offload (Rel. 10), 3GPP TR 23.829 are obtainable further details with regard to LIPA and SIPTO.

For several purposes, operators are interested in having full control of how traffic pertaining to a particular user and IP connection/flow should be routed: via the core network or directly via a local network in support of local network protocol access or selective network protocol traffic offload.

SUMMARY OF THE INVENTION

Thus, it is an object of the present invention to improve and further develop a method for controlling the traffic within a network structure and an according network structure in such a way, that a reliable and flexible control of traffic within the network structure is possible without the addition of remarkable complexity to the core network.

In accordance with the invention, the aforementioned object is accomplished by a method according to claim 1. According to this claim the method is characterized in that on the basis of a predefinable routing policy said DNS server is controlling whether a traffic from a UE to a destination address within a local network associated to the HeNB or HNB or eNB or NB or within a PDN and/or vice versa will be routed via the core network or directly via a local network in support of local network protocol access or selective network protocol traffic offload.

Further, the aforementioned object is accomplished by a network structure. Such a network structure is characterized in that the DNS server is configured in a way that on the basis of a predefinable routing policy said DNS server is controlling whether a traffic from a UE to a destination address within a local network associated to the HeNB or HNB or eNB or NB or within a PDN and/or vice versa will be routed via the core network or directly via a local network in support of local network protocol access or selective network protocol traffic offload.

According to the invention it has been recognized that the control of traffic within a network structure is possible in a very easy and reliable way by the DNS server. Further, it has been recognized that the controlling procedure can be based on predefinable routing policy which can be provided to the DNS server. Thus, traffic (e.g. IP flows) from a UE to a destination address and/or vice versa can be routed via the core network or directly via a local network (or a local traffic offload node nearby the Radio Access Network—RAN). The last mentioned routing procedures can be selected depending on the position of the destination address within a local network, which is associated to the HeNB or HNB or eNB or NB, or within the PDN.

With such a control, operators will be able to flexibly and dynamically enable the routing via a local network (or a local traffic offload node nearby the RAN) for certain type of traffic and/or users (IP flows) in order to monitor traffic, to allow for traffic inspection for legal purposes, to optimize access to specific network services, e.g. to ensure a fast access, mobility and QoS (Quality of Service) and to add value to network services, e.g. block access to specific sites.

Preferably, the PDN is the Internet, the network protocol is IP, the local network protocol access is LIPA (Local IP (Internet Protocol) Access) and the selected network protocol traffic offload is SIPTO (Selected IP Traffic Offload). In this case the operator will be able to flexibly and/or dynamically disable LIPA/SIPTO for certain type of traffic and/or users (IP flows) with regard to the above mentioned purposes.

According to a preferred embodiment said DNS server could indicate—upon a DNS request by the UE—in a DNS response arouting information with regard to the traffic routing via the core network or via the local network (or a local traffic offload node nearby the Radio Access Network—RAN). In this way the controlling procedure can be started very easily by a DNS request of the UE. This DNS-based dynamic routing policy configuration/management can be done in a centralized fashion at the DNS server and thus eases the management and operation associated with controlling traffic either via the core network or via the local network (or a local traffic offload node nearby the Radio Access Network—RAN).

With regard to a very flexible traffic routing a LP-GW (Local PDN Gateway—also known as L-GW or traffic offload function (TOF)) could be associated or collocated with the HeNB or HNB or eNB or NB. Preferably, a DNS proxy functionality could be implemented at the LP-GW. This functionality could intercept the DNS request and forward it to the operator DNS server. In response to the DNS request, the DNS server could send a DNS response with the destination address and preferably with additional information that indicates how the traffic should be handled.

For providing the routing information in a very easy manner the routing information could be provided by a flag in the DNS response, that indicates to the HeNB or eNB or to a LP-GW the subsequent traffic routing.

With regard to a very reliable traffic control and to supporting service continuity of the traffic a DNS proxy functionality could be implemented at the HeNB or eNB or at a LP-GW to provide a local DestNAT (Destination Network Address Translation) network protocol address to the UE as part of the DNS response and to establish the binding/association between the local DestNAT and the destination address within the local network or within the PDN. Preferably, the DNS server could request the LP-GW for a DestNAT address for the destination address within the local network or within the PDN, if there is no DNS proxy functionality at the LP-GW. In that case, the DNS server would provide the DestNAT directly to the requesting UE.

According to a preferred embodiment the H(e)NB or (e)NB (HeNB or HNB or eNB or NB) or a LP-GW could have a Twice-NAT functionality for translating the addresses of both source and destination into two different addresses, a SrcNAT (Source Network Address Translation) address and DestNAT address, respectively. Further, a stateless Twice-NATing could be performed, if the DestNAT address includes the destination address within the local network or within the PDN. For instance, in case IPv6 is used between UE and LP-GW and the real IP address of the destination is an IPv4 address, the DestNAT can take for example a format similar to "2001:3001:2521:5323:FFFF:FFFF:FFFF:IPv4-address-of-destination".

Without the involvement of LP-GW or HeNB or eNB with DNS proxy functionality, the DNS server could directly provide the DestNAT address to the UE. Such a DestNAT address could be provided in the same format as mentioned within the last paragraph.

Based on the above explained Twice-NATing service continuity for local IP access traffic or for a selected IP traffic offload, e.g. SIPTO, traffic could be achieved upon a handover of a UE to different H(e)NBs or (e)NBs.

According to another preferred embodiment service continuity for a local IP access traffic or a selected IP traffic offload traffic upon a handover of a UE to a different H(e)NB or (e)NB could be achieved using simple tunnelling or source routing. Within a concrete embodiment the UE could support a tunnelling mechanism to the H(e)NB or (e)NB.

Preferably, a network layer of the UE could maintain a per-connection or flow state to decide whether an IP flow/traffic should be tunnelled or not.

Alternatively, the UE could support a source routing mechanism for maintaining the above mentioned service continuity.

Within a further preferred embodiment, two addresses could be indicated in the DNS response, one address indicating the destination address within the local network or within the PDN and the other address used for tunnelling.

Within an alternative approach two addresses could be indicated in the DNS response, the address of the LP-GW, routable within the PDN, and the destination address within the local network or within the PDN.

The above mentioned embodiments refer to solutions for UEs supporting only single PDP (Packet Data Protocol) context/PDN connection. However, there could be scenarios with UEs supporting multiple PDP context/PDN connections. In this case, said DNS server could select and indicate—upon a DNS request by the UE—in a DNS response to the UE which APN to use for a particular traffic flow or connection. In this solution service continuity with regard to local network protocol access traffic or "selected network protocol traffic offload" traffic will be supported by the core network.

According to a preferred embodiment at least one PDP context/PDN connection could be dedicated for LIPA and/or SIPTO. The DNS server can select the relevant PDP context/PDN connection.

Preferably, the DNS server could have prior knowledge on available APNs or PDP context/PDN connections.

Within a further preferred embodiment the UE could notify APNs currently available to UE in the prior DNS request. Thus, the DNS server could be actually informed about available APNs of PDP context/PDN connections.

Preferably, the DNS server could base its APN selection on parameters or metrics that prioritize the available APN or APNs.

Thus, the UE, which is capable to identify the recommended APN from the DNS response could accordingly route the traffic.

According to a preferred embodiment the DNS server can also indicate—only by using a flag in the response—that the UE should use a pre-configured APN for a particular traffic flow or connection.

According to a preferred embodiment the UE—due to an indication or flag in a DNS response—may not cache results of DNS requests for local network protocol access and/or selected network protocol traffic offload or may fully disable DNS caching for respective APNs.

Within a further preferred embodiment the UE could be involved in the selection process of the DNS server.

The invention presents a set of mechanisms that enable operators to control traffic handling of UEs and decide on how to route it, via a local network protocol access or a selected network protocol traffic offload, e.g. LIPA or SIPTO, or core network. The decision could depend on the domain name, kind or type of the destination address, kind or type of application. Technical effects on the implementations of LP-GWs at H(e)NBs/(e)NBs, DNS servers, and/or UEs are expected—depending on the particular embodiment.

Within the present invention are given different solutions that enable an operator to dynamically control whether a traffic flow of a particular UE should be routed directly via a local network (or a local traffic offload node nearby the Radio Access Network—RAN) or via the core network.

The invention is also related to service continuity of preferably LIPA/SIPTO traffic. In the discussion, there is considered LIPA/SIPTO at H(e)NB, but the same devised approaches can be easily applied to the case of MACRO SIPTO at (e)NBs.

The invention enables operators to dynamically/flexibly control whether a particular traffic to/from a particular UE should be routed via LIPA/SIPTO or the operator core network. Further, there are considered solutions that support service continuity of LIPA/SIPTO traffic and those that do not, for the purpose of applying different charging schemes. Further, there are considered solutions that are completely transparent to UEs, so operators have full control.

The above mentioned objects are achieved with minimal or no additional complexity to the core network. Modifications at the UEs are minimized and the solutions require no or only simple modifications at one single layer, application or network layer.

There are several ways how to design and further develop the teaching of the present invention in an advantageous way. To this end it is to be referred to the patent claims and to the following explanation of preferred embodiments of the invention by way of example, illustrated by the figures on the other hand. In connection with the explanation of the preferred embodiments of the invention by the aid of the figures, generally preferred embodiments and further developments of the teaching will we explained.

BRIEF DESCRIPTION OF THE DRAWING FIGURES

Figure 2:
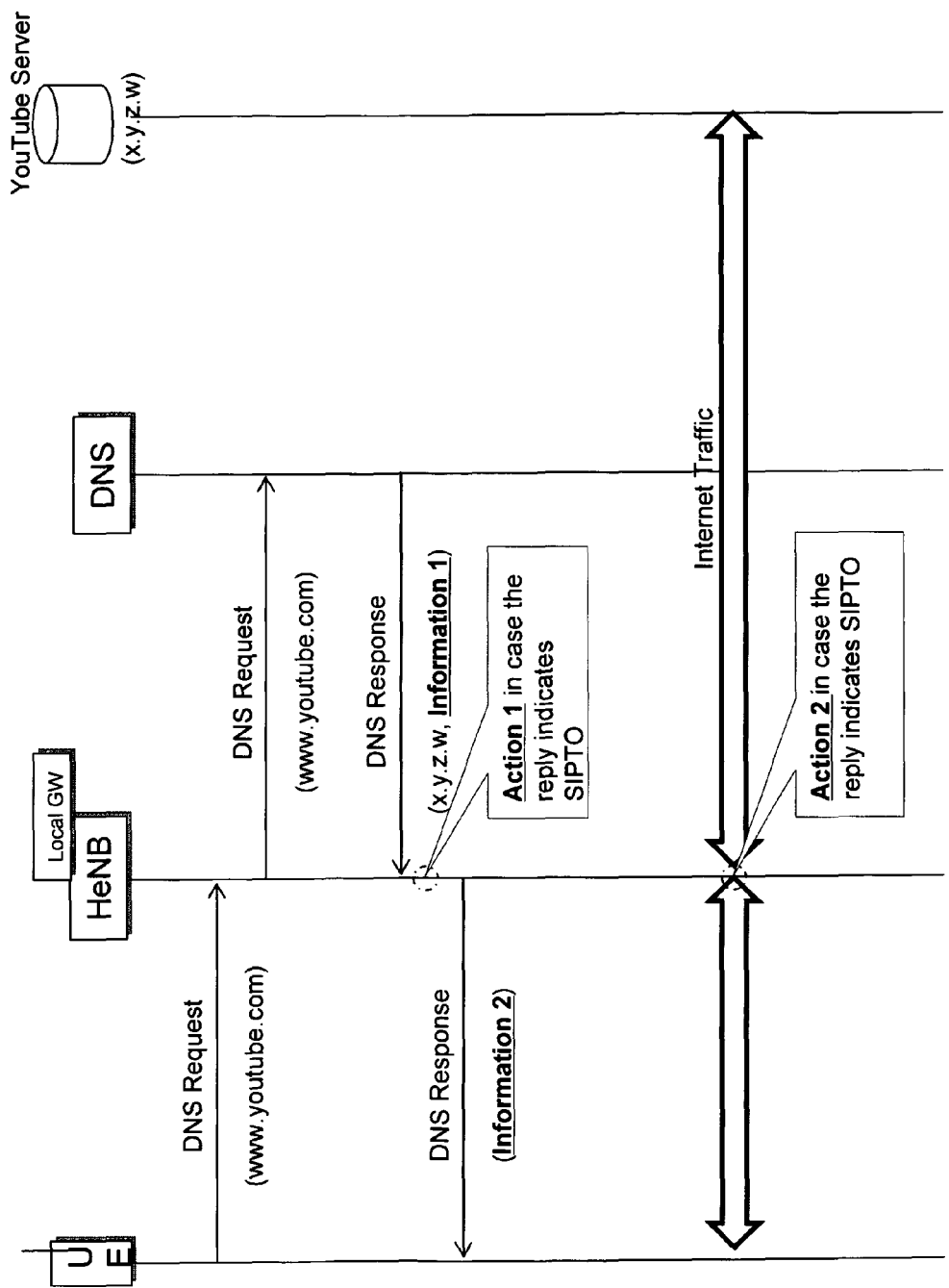
Figure 3:
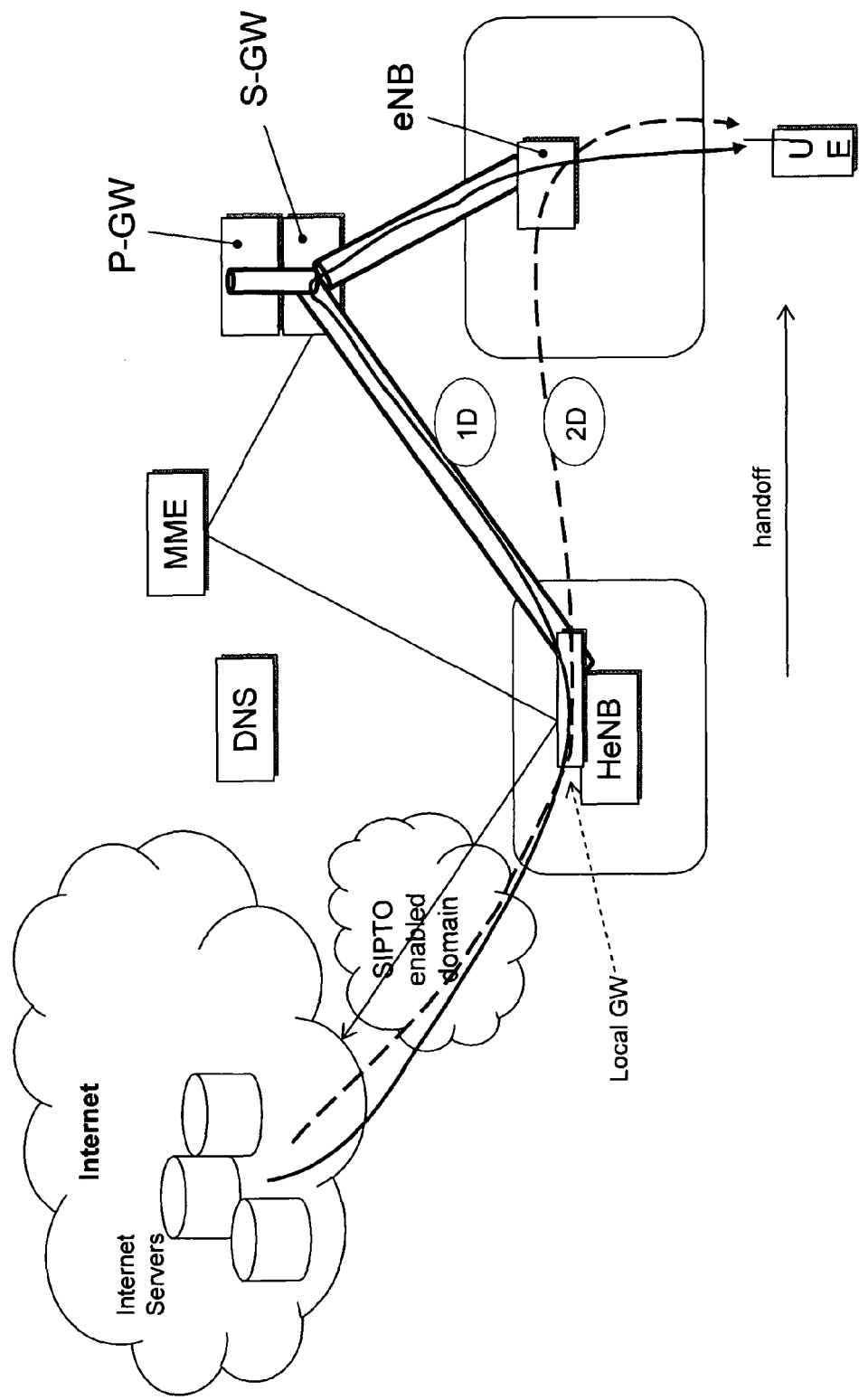
Figure 4:
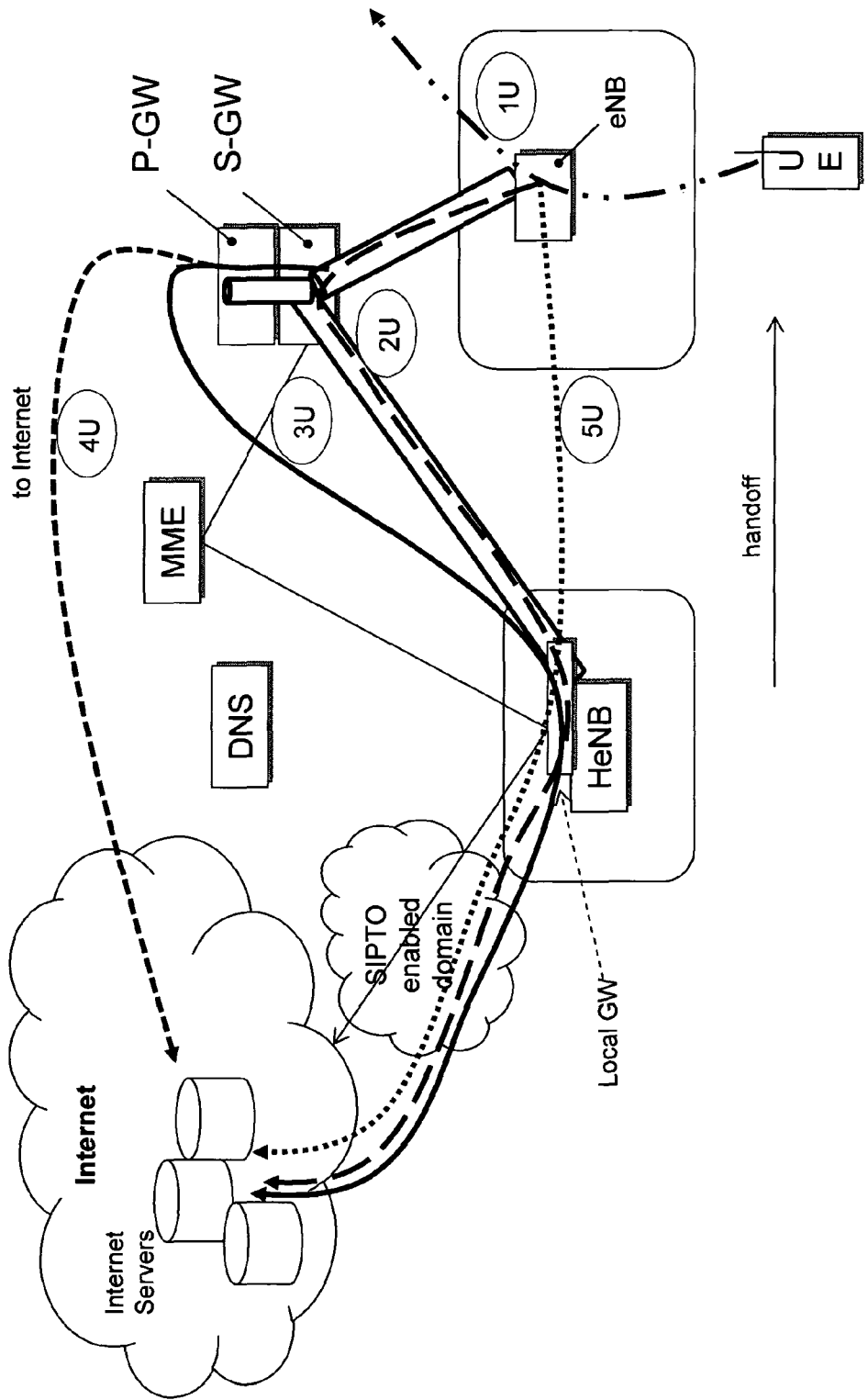
Figure 5:
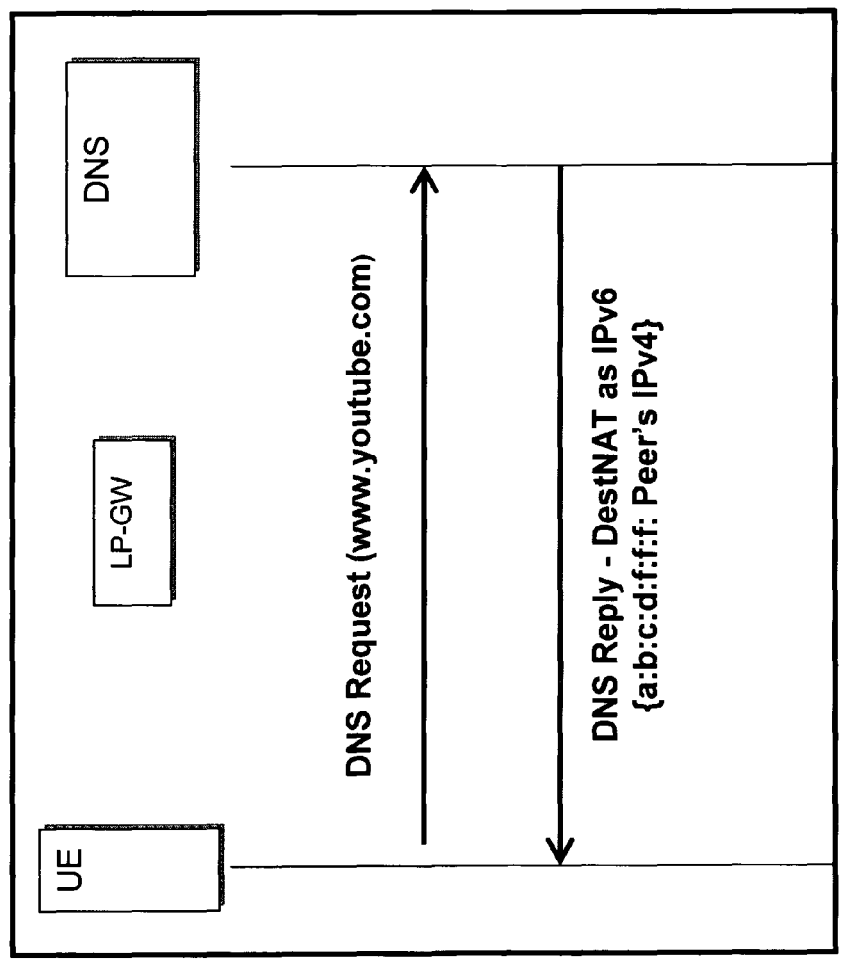

FIG. 1 is a diagram schematically illustrating an overall network architecture,

FIG. 2 is a diagram schematically illustrating a LIPA/SIPTO traffic handling by an operator DNS, FIG. 3 is a diagram schematically illustrating possible paths for downlink traffic after handoff to a new HeNB or eNB, FIG. 4 is a diagram schematically illustrating possible paths for uplink traffic after handoff to a new HeNB or eNB and FIG. 5 is a diagram schematically illustrating a direct communication between UE and DNS server.

DETAILED DESCRIPTION OF THE INVENTION

In the following description is considered the case of the Internet as a PDN. Thus, the network protocol will be IP, the local network protocol access will be LIPA, and the selected network protocol traffic offload will be SIPTO. However, the following description shall not be seen as limitation to the Internet case. The given solutions will also be valid for other PDNs. Insofar, also other PDNs are involved in an analogous consideration.

The following embodiments are based on DNS routing policies. First, there are explained two solutions that are based on "Twice-NATing" and "simple tunnelling", respectively. Both solutions consider the scenario where a UE has or supports only one single PDP context/PDN connection for LIPA/SIPTO and non-LIPA/SIPTO traffic (i.e. it shall be noted that these solutions can also support a UE supporting multiple PDP contexts/PDN connections). In another solution, there is considered the case where a UE has or supports multiple PDP contexts/PDN connections. In this solution, the operator explicitly indicates, via a DNS reply to a DNS query from a UE, to the UE which APN it should use for a particular traffic.

For giving an overview, these three solutions are briefly summarized as follows:
  Solutions based on single PDP Context/PDN connection (applicable also to UEs supporting multiple APNs):
    DNS-based routing policies in operator DNS:
      Operator controls traffic handling based on DNS resolutions. Service continuity for LIPA traffic can be supported either with no additional complexity in core network (when the traffic tunnelled to the P-GW and then routed to the LP-GW based on normal IP routing) or with little additional complexity in the S-GW (when the traffic is directly routed to the LP-GW by the S-GW) through either:
      Twice-NATing:
        DNS resolution gives the UE a Destination IP address (DestNAT) to which traffic in the operator network is routed to the LP-GW (based on configuration), which performs Twice-NAT. Here, traffic handling is transparent to UEs.
      Simple Tunnelling:
        DNS resolution informs the requesting UE of the LP-GW address, which the UE can use for simple IP-in-IP tunnelling of those flows that it should send via LIPA/SIPTO. UE requires simple extra functionality, but could also be involved in the decision. Alternatively to simple tunnelling, source routing and routing header in IPv6 can be also used.
  Solution based on multiple PDP Contexts/PDN connections (DNS-based):
    Operator controls traffic handling based on DNS replies that indicate to a UE which APN to use for a particular IP flow/connection. UE requires minimal extra functionality, but could also be involved in decision process. Service continuity for LIPA/SIPTO traffic is supported in this solution.

The following description is mainly directed to SIPTO at H(e)NB, but the same solutions can be applied to the case of SIPTO at macro (e)NBs.

1. Network Architecture

FIG. 1 depicts the major components of the envisioned architecture, namely a SIPTO enabled domain or PDN, e.g. Internet, core DNS server, MME (Mobility Management Entity), (H)eNB (or alternatively (H)NB for 3G), UE, Core P/S-GWs (or alternatively GGSNs/SGSNs for GPRS), and a local gateway collocated with (H)eNB/(H)NB, called LP-GW.

To simplify the description, the text and figures only refer to the EPS architecture (i.e. (H)eNB, S-GW, P-GW). The concepts apply equally to the GRPS architecture (i.e. (H)NB, RNC, SGSN, GGSN). The local gateways may also not be collocated with (H)eNB/(H)NBs.

In this description, two types of UEs are considered: UEs using one single PDN connection (have one IP address) for both LIPA/SIPTO and non-LIPA/SIPTO traffic and UEs using multiple PDN connections (e.g., at least one dedicated for LIPA/SIPTO).

The Local Gateway (LP-GW or L-GW or TOF) collocated with (H)eNB can be either a local P-GW with functionalities of P-GW (e.g., in case of UEs using multiple APNs) or a simple L-GW (i.e. only including the necessary P-GW functions).

2. LIPA/SIPTO Traffic Control

In the envisioned mechanisms, decision on which traffic is to be handled via the macro network and which one to be offloaded via LIPA/SIPTO is taken by the operator via core DNS resolutions.

FIG. 2 shows how DNS is involved in the SIPTO/LIPA traffic handling. We consider a scenario whereby a UE desires to connect to YouTube server while being at home (i.e., via HeNB with a local GW collocated). A DNS proxy is assumed to be at the Local GW.

Initially, the UE issues a DNS request to the core DNS server requesting the IP address of the YouTube server. The local DNS proxy at the Local GW intercepts the DNS request and forwards it to the operator DNS server. In response to the DNS request, the Operator DNS server sends a DNS reply with the IP address of the peer (YouTube) along with additional information (e.g., Information 1 in FIG. 2) that indicates how the traffic should be handled. Following the DNS reply from the Core DNS, the local GW takes Action 1 in case the reply indicates LIPA/SIPTO traffic and sends a DNS reply with particular Information 2.

A simple "DNS-based LIPA/SIPTO control" solution, referred to as Simple Source NATing, works according to the steps of FIG. 2 with the following features:
Information 1: LIPA/SIPTO flag that indicates how the traffic should be handled (via LIPA/SIPTO or macro).
Information 2: Global IP address of peer (YouTube)
Action 1: Store at Local GW (or H(e)NB) the external IP address of the peer (YouTube) as this traffic should be subject to LIPA/SIPTO.
Action 2: Apply simple source NATing: Local GW adds an entry in its NAT table for translating the IP address of UE into an address of the local GW.

It should be emphasized that whilst we involve a DNS proxy at the local GW in the DNS resolution, with the simple modifications described above the DNS resolution can be also performed in an E2E (End-to-End) fashion.

3. Support of Service Continuity for SIPTO Traffic

FIGS. 3 and 4 depict all possible paths for both uplink and downlink traffic upon handoff or handover of a UE to a target (H)eNB.

Initially, we consider the case of UEs using only one single APN. There are two possible paths for downlink traffic, namely 1D and 2D, and five possible paths for uplink traffic namely 1U-5U. In case LIPA/SIPTO is handled via IP flow filters, which either are provided dynamically (via PCRF) or have been provided pro-actively (via HMS (HeNB Management System)) to the target (H)eNB, the uplink traffic can break-out at the target (H)eNB (i.e., path 1U in FIG. 4).

In the DNS-based LIPA/SIPTO control solution, the target (H)eNB has no information about the decision taken during the DNS resolution at the source (H)eNB and as a result, the uplink traffic will break-out at the P-GW (i.e., path 4U in FIG. 4). As a result, service continuity cannot be supported, as the correspondent node (YouTube server) will see a different source IP address of the UE (i.e., UE's global operator IP address). This, of course, excludes the case of mobility-aware applications or if additional IP mobility solutions (e.g. Mobile IP) are used "on-top-of" the functionality provided by the mobile core.

Service continuity for ongoing SIPTO/LIPA traffic can be supported only if the break-out point for ongoing connections remains the same (i.e. in the local GW of the source (H)eNB). This implies that a mechanism is needed to route the UL (Uplink) traffic from the UE to the anchor L-GW at (H)eNB and the DL (Downlink) traffic from the anchor L-GW at (H)eNB to the UE. This is possible when downlink and uplink traffic traverse paths 1D or 2D and 2U, 3U or 5U, respectively. Path 3U can be established with some additional implementation-level functions at L-GW (to be explained later) but with no additional complexity to P/S-GWs. In the uplink, path 2U and 5U are clearly more optimized than Path 3U in terms of resource savings and E2E delay; it however requires some extra functionality at S-GW or eNB respectively that shall enable S-GW or eNB to distinguish SIPTO traffic from non-SIPTO traffic, break it out and route it to the source (H)eNB. In the downlink, path 2D is also more optimal, but this either requires the establishment of a direct tunnel between Local GWs in the source and target (H)eNBs or support for data forwarding over the X2 interface between the source and target (H)eNBs.

In the following, we define the mechanisms/methods required to enable service continuity for ongoing SIPTO/LIPA traffic.

Twice-NATing Based SIPTO Service Continuity Support:

In this solution, the SIPTO traffic handling follows steps of FIG. 2 with the following features:
Information 1: SIPTO flag that indicates how the traffic should be handled via SIPTO or macro network.
Information 2: Global IP address of peer in case of non-SIPTO traffic. Otherwise, a local IP address of the local GW—a destination NAT address—that is routable within the macro network and referred to as DestNAT.
Action 1: Allocate a local destination NAT address (DestNAT) and associate it with global IP address of the peer (YouTube).
Action 2: Perform Twice NAT: translate the DestNAT address to the global IP address of the peer (YouTube) and the UE's IP address (source IP) into the external NAT address (Source NATing).

Using the DestNAT (which is assumed to be routable within the operator network towards the source (H)eNB in this solution) and Source NAT, service continuity of the SIPTO traffic can be guaranteed upon handoff of the UE to a target eNB by enforcing the downlink and uplink traffic to follow paths 1D or 2D and 2U, 3U or 5U, as shown in FIGS. 3 and 4, respectively.

In the uplink, path 3U can easily be established as this requires merely the Twice-NATing functionality in the L-GW, which needs to intercept packets sent to the DestNAT address and perform the Twice-NATing operation. Path 2U and 5U requires some extra functionality in the S-GW or eNB, respectively, to detect traffic targeted to the L-GW, based on the DestNAT address range, for those PDN connections that are potentially subject to SIPTO/LIPA, which is then broken out of the PDN connection and routed directly to the L-GW, based on the routable DestNAT address.

In the downlink, path 1D follows the normal/standardized path. The optimization of 2D would rely on extra functionality in the L-GWs and/or source/target (H)eNBs to establish a direct tunnel between the L-GWs in the source and target (H)eNBs or support for data forwarding over the X2 interface between the source and target (H)eNBs.

Since the DestNAT address of the Internet server is routable within the operator network, the (H)eNB, S-GW or P-GW is able to route the traffic to the LP-GW that anchors an ongoing connection. The tunnel between S-GW and LP-GW may be released immediately after the handover by the S-GW, or may be released either by the S-GW or the L-GW after a certain idle time, i.e. no traffic through the tunnel for some time. This shall have no impact on the E2E communication between UE and LP-GW: Routing of uplink traffic at S-GW is based on the IP address of LP-GW, i.e. DestNAT.

Instead of having the DNS proxy in the eNB/LP-GW, the DNS resolution could also occur "End-to-End" between UE and DNS server. In this regard, the DNS server could directly provide the real/global IPv4 address as part of the DestNAT. For reference, see FIG. 5.

In this solution, address space for Destination NAT IP Addresses at LP-GW may be limited as DestNAT must be routable in complete operator network. This limitation can be overcome in case of IPv4 and IPv6 support or by using UE's source/destination port numbers in conjunction with the UE's IP address to perform the DestNAT.

To avoid caching of DNS results for SIPTO traffic, the DNS response can include an adequate indication, e.g. SIPTO flag, based on which UEs do not cache results of DNS query, or may alternatively fully disable DNS caching for SIPTO capable APNs.

Simple-Tunnelling Based SIPTO Service Continuity Support:

In this solution, the SIPTO traffic handling follows steps of FIG. 2 with the following features:
Information 1: LIPA/SIPTO flag that indicates how the traffic should be handled via LIPA/SIPTO or macro network.
Information 2: Global IP address of peer (YouTube) in case of non-LIPA/SIPTO traffic. Otherwise, two addresses: the IP address of the local GW, routable within the macro network, and the global IP address of the peer (YouTube).
Action 1: Include the IP-in-IP tunnelling address of the local GW by means of a new DNS record.
Action 2: Simple source NATing, i.e. UE is the source.

In this solution, from a DNS reply indicating two addresses (i.e., Information 2), the UE understands that this IP connection is subject to LIPA/SIPTO via the local GW and tunnels the uplink traffic to the local GW address using simple IP-in-IP tunnel. The Simple Tunnelling mechanisms could alternatively be achieved through Source Routing, e.g. based on the IPv6 Routing Header; in this case, the UE and Local GW would require the necessary functionality. The UE maintains per-connection/flow state to decide whether a flow should be tunnelled or not. This information can be kept at network-layer and can thus be completely transparent to the application layer. Upon reselection of a new (H)eNB, the UE flushes its DNS cache in order to get the new LP-GW address with the next DNS resolution.

In this solution, since the IP address of the LP-GW or local GW (which is used for the simple tunneling) is routable within the operator network, service continuity of the SIPTO traffic can be supported.

In this solution, which assumes that the IP address of the local GW is routable within the operator network towards the source (H)eNB, service continuity of the SIPTO/LIPA traffic can be guaranteed upon handoff of the UE to a target eNB by enforcing the downlink and uplink traffic to follow paths 1D or 2D, and 2U, 3U or 5U, as in FIGS. 3 and 4, respectively.

In the uplink, path 3U can easily be established as this requires merely the Simple Tunnelling functionality in the L-GW, which needs to terminate the tunnel and route the traffic towards the final destination in the local network or PDN. Path 2U and 5U require some extra functionality in the S-GW or eNB respectively to detect traffic targeted to the L-GW (based on the L-GW address range) for those PDN connections that are potentially subject to SIPTO/LIPA, which is then broken out of the PDN connection and routed directly to the L-GW.

In the downlink, path 1D follows the normal/standardized path (e.g. via the P-GW). The optimization of 2D would rely on extra functionality in the L-GWs and/or source/target (H)eNBs to establish a direct tunnel between the L-GWs in the source and target (H)eNBs or support for data forwarding between the source and target (H)eNBs.

LIPA/SIPTO SERVICE CONTINUITY SUPPORT FOR UEs USING MULTIPLE APNs (with at Least One Dedicated for LIPA/SIPTO):

In this solution, UEs are assumed to have multiple established PDP contexts/PDN connections with different APNs, with at least one APN dedicated for LIPA/SIPTO. The Operator DNS indicates, preferably in an E2E fashion, to the UE which APN (see the options below) to use for a given flow upon receiving a DNS query from the UE. As a result, the UE accordingly uses the PDN connection assigned with the APN that was indicated by the operator in the DNS query. Service continuity for LIPA/SIPTO traffic is also supported as the standard mobility procedures ensure that the PDN connections are maintained during handover. The downlink and uplink traffic follow paths 1D and 2U as shown in FIGS. 3 and 4, respectively.

In this solution, the DNS server must be aware of the configured APNs. The UE may also inform the DNS server of active APNs (currently available to UE) as part of the DNS request. The DNS server may also recommend a list of APNs in order of priority that is defined based on different parameters/metrics. The DNS server may also simply set up a flag that indicates whether LIPA/SIPTO should be used. In this case, UE must be able to autonomously identify the adequate APN for LIPA/SIPTO based on operator configurable conventions.

In response to the DNS reply, the UE binds the new IP flow/connection (socket) to the UE's IP address associated with the recommended PDN connection/APN. The UE requires simple network-level functionality for the binding process (independently from the application layer) of the new IP flow/connection with the recommended APN and could also be involved in the decision process.

In the present description are proposed solutions for handling LIPA/SIPTO traffic control considering two types of UEs, namely UEs supporting only one single APN/PDN connection and UEs supporting multiple APNs (with simultaneous PDN connections) with at least one dedicated for LIPA/SIPTO.

All solutions are based on the operator's core DNS and some support service continuity of LIPA/SIPTO traffic by enforcing both downlink and uplink traffic to traverse the Local GW at the (H)eNB, which anchors the IP flow/connection.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A method for controlling traffic within a network structure, said structure comprising a local network comprising a first element, the first element including a home evolved Node B (HeNB) or home Node B (HNB) or evolved Node B (eNB) or Node B (NB);

a packet data network (PDN) connected to the local network via the first element;

an operator core network connected to the local network via the first element, the operator core network including a DNS server;

a user equipment (UE) that is associated with said first element, the method comprising:

receiving, at the DNS server in the core network, a DNS message sent by the UE, requesting an IP address for establishing a traffic flow from the UE to a destination IP address, where the request includes access point names (APNs) that are available to the UE;

determining, by the DNS server, whether the traffic flow is to be routed via the core network OR directly via the PDN in support of local network protocol access or selected network protocol traffic offload, the determination based on a predefinable routing policy;

selecting, by the DNS server, routing information to be communicated in response to the DNS request based on the determination, where the routing information includes an APN that is selected by the DNS server for use with the traffic flow;

sending, by the DNS server, a DNS response message to the UE, the DNS response including the selected routing information, in response to receiving the DNS response message, establishing, by the first element, a tunnel from the first element to a PDN-Gateway (P-GW) or serving gateway (S-GW) of the core network; and storing, at the UE, per-flow state information indicating whether traffic associated with the flow should be tunneled or not.

2. A method according to claim 1, wherein the routing information is provided by a flag in the DNS response, that indicates to the HeNB or HNB or eNB or NB or to a LP-GW the subsequent traffic routing.

3. A method according to claim 1, wherein a DNS proxy functionality is implemented at the HeNB or HNB or eNB or NB or at a LP-GW and provides a DestNAT (Destination Network Address Translation) network protocol address to the UE as part of the DNS response and to establish the binding/association between the DestNAT and the destination address within the local network or within the PDN.

4. A method according to claim 3, wherein a stateless Twice-NATing will be performed, if the DestNAT address includes the destination address within the local network or within the PDN.

5. A method according to claim 1, wherein a LP-GW (Local PDN Gateway or L-GW) is associated to or collocated with the HeNB or HNB or eNB or NB.

6. A method according to claim 5, wherein said LP-GW is a LGGSN (Local GGSN) and is associated to or collocated with a HNB or NB.

7. A method according to claim 5, wherein the DNS server requests the LP-GW for a NAT for the destination address within the local network or within the PDN, if there is no DNS proxy functionality at the LP-GW.

8. A method according to claim 1, wherein a DNS proxy functionality is implemented at LP-GW or at the HeNB or HNB or eNB or NB.

9. A method according to claim 1, wherein the HeNB or eNB or a LP-GW has a Twice-NAT functionality for translating the addresses of both source and destination into two different addresses, a SrcNAT (Source Network Address Translation) address and DestNAT address, respectively.

10. A method according to claim 1 wherein, without the involvement of LP-GW or HeNB or HNB or eNB or NB, the DNS server directly provides the DestNAT address of the LP-GW or HeNB or HNB or eNB or NB, which is obtained by the DNS server from the LP-GW or HeNB or HNB or eNB or NB via some other means.

11. A method according to claim 1, wherein the P-GW is a GGSN and the S-GW is a SGSN.

12. A method according to claim 1, wherein the HeNB or HNB or eNB or NB or an LP-GW supports a tunneling mechanism to the UE.

13. A method according to claim 1, wherein a network layer of the UE maintains a per-connection or flow state to decide whether a traffic should be tunneled or not.

14. A method according to claim 1, wherein the UE supports a source routing mechanism.

15. A method according to claim 1, wherein two addresses are indicated in the DNS response, the address of the LP-GW or a local GW, routable within the core network, and the destination address within the local network or within the PDN.

16. A method according to claim 1, wherein said DNS server selects and indicates—upon a DNS request by the UE—in a DNS response to the UE which APN to use for a particular traffic or flow or connection, if the UE has or supports multiple PDP (Packet Data Protocol) context/PDN connections with different APNs.

17. A method according to claim 16, wherein at least one PDP context/PDN connection is dedicated for LIPA and/or SIPTO.

18. A method according to claim 16, wherein the DNS server has prior knowledge on available APNs or PDP contexts/PDN connections.

19. A method according to claim 16, wherein the DNS server bases its APN selection on parameters or metrics that prioritize the available APN or APNs.

20. A method according to claim 16, wherein the UE, due to an indication or flag in a DNS response, does not cache results of DNS responses subject to local network protocol access and/or selected network protocol traffic offload and preferably fully disables DNS caching for respective APNs.

21. A method according to claim 16, wherein the UE is involved in the final selection process of the APN or PDP context/PDN connection to be used for the traffic routing.

22. A network structure comprising:

a local network comprising a first element, the first element including a home evolved Node B (HeNB) or home Node B (HNB) or evolved Node B (eNB) or Node B (NB);

a packet data network (PDN) connected to the local network via the first element;

an operator core network connected to the local network via the first element, the operator core network including a DNS server;

a user equipment (UE) that is associated with said first element, said DNS server configured to:

receive a DNS message sent by the UE requesting an IP address for establishing a traffic flow from the UE to a destination IP address, where the request includes access point names (APNs) that are available to the UE;

determine whether the traffic flow is to be routed via the core network OR directly via the PDN in support of local network protocol access or selected network protocol traffic offload, the determination based on a predefinable routing policy;

select routing information to be communicated in response to the DNS request based on the determination, where the routing information includes an APN that is selected by the DNS server for use with the traffic flow;

send a DNS response message to the UE, the DNS response including the selected routing information, wherein said first element configured to establish, in response to receiving the DNS response message, a tunnel from the first element to a PDN-Gateway (P-GW) or serving gateway (S-GW) of the core network; and said UE configured to store per-flow state information indicating whether traffic associated with the flow should be tunneled or not.

\* \* \* \* \*